United States Patent [19]
Breda

[11] Patent Number: 6,123,094
[45] Date of Patent: Sep. 26, 2000

[54] SINGLE LEVER VALVE AND CARTRIDGE WITH INTEGRAL MIXING CHAMBER AND DIVIDED WATERWAY

[75] Inventor: Silvano Breda, 125 Limestone Crescent, Downsview, Ontario, Canada, M3J 2R1

[73] Assignee: Silvano Breda, Downsview, Canada

[21] Appl. No.: 08/900,719

[22] Filed: Jul. 28, 1997

[30] Foreign Application Priority Data

Jul. 29, 1996 [CA] Canada ................................ 2182259

[51] Int. Cl.[7] ...................................... F16K 11/02
[52] U.S. Cl. .................. 137/98; 137/270; 137/454.6; 137/597
[58] Field of Search .................. 137/98, 454.6, 137/597, 270

[56] References Cited

U.S. PATENT DOCUMENTS

| Re. 25,920 | 11/1965 | Moen | 137/454.2 |
|---|---|---|---|
| 2,308,127 | 1/1943 | Symmons | 277/36 |
| 2,519,158 | 8/1950 | Symmons | 137/597 |
| 3,448,755 | 6/1969 | Symmons | 137/100 |
| 3,730,222 | 5/1973 | Moen | 137/625.17 |
| 3,814,120 | 6/1974 | Moen | 137/242 |
| 3,960,016 | 6/1976 | Symmons | 73/343 |
| 4,033,371 | 7/1977 | Keedwell | 137/100 |
| 4,183,376 | 1/1980 | Moen | 137/625.17 |
| 4,330,011 | 5/1982 | Moen | 137/625.17 |
| 4,395,018 | 7/1983 | Moen | 251/310 |
| 4,469,121 | 9/1984 | Moen | 137/100 |
| 4,782,853 | 11/1988 | Moen | 137/454.6 |
| 4,813,455 | 3/1989 | Iqbal | 137/625.17 |
| 4,901,750 | 2/1990 | Nicklas et al. | 137/270 |
| 4,917,137 | 4/1990 | Symmons | 137/98 |
| 4,979,530 | 12/1990 | Breda | 137/597 |
| 5,275,195 | 1/1994 | Breda | 137/100 |

FOREIGN PATENT DOCUMENTS

| 978050 | 11/1975 | Canada. |
|---|---|---|
| 1052229 | 4/1979 | Canada. |
| 1116581 | 1/1982 | Canada. |
| 1151629 | 8/1983 | Canada. |
| 1293175 | 12/1991 | Canada. |

Primary Examiner—Stephen M. Hepperle
Attorney, Agent, or Firm—Ivor M. Hughes; Neil H. Hughes; Marcelo K. Sarkis

[57] ABSTRACT

A valve assembly is provided including a housing having an opening wherein a cartridge is inserted. The housing has axially aligned inlets and outlets for hot and cold water. The cartridge includes a stationary sleeve containing a rotatable stem member. The stem member carries a compound seal having a first primary sealing portion for sealing the inlet of the stationary sleeve and a secondary seal portion for separating first and second chamber areas of the stem member. Preferably the outlets of said moveable stem and said stationary sleeve are substantially L-shaped, and inverted L-shaped respectively, which are selectively alignable to provide for an increased volume of water through the valve assembly. The housing includes a dividing dam in the outlet splitting the outlet in two. When a diverting mechanism typically found on the spout outlet of a tub is operated, the water entering the spout will be diverted back into a second waterway area of the stationary sleeve provided between the sleeve and the housing, passing the water up to the shower outlet.

12 Claims, 10 Drawing Sheets

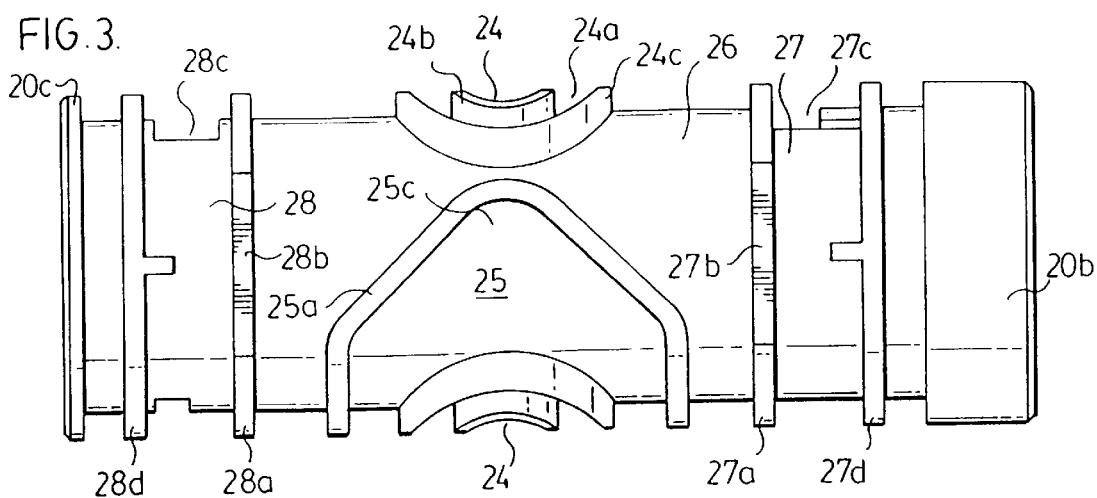
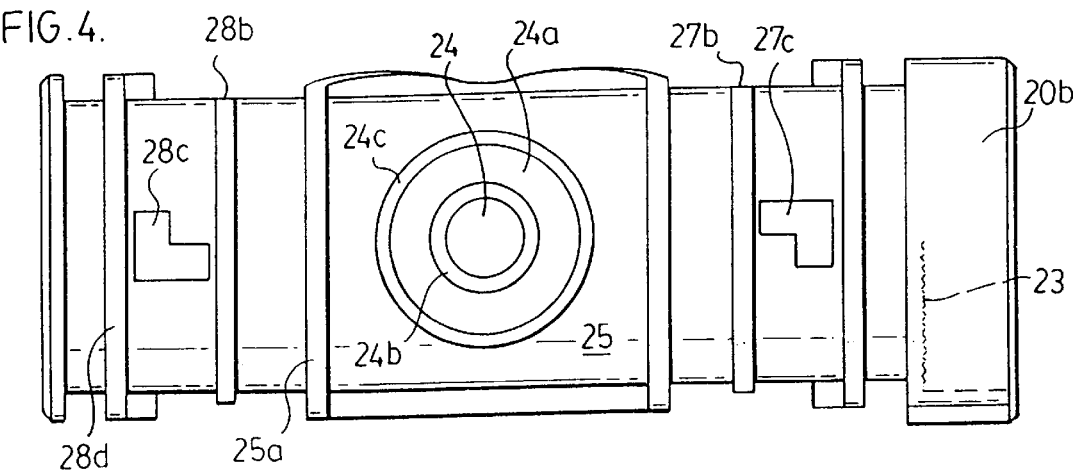
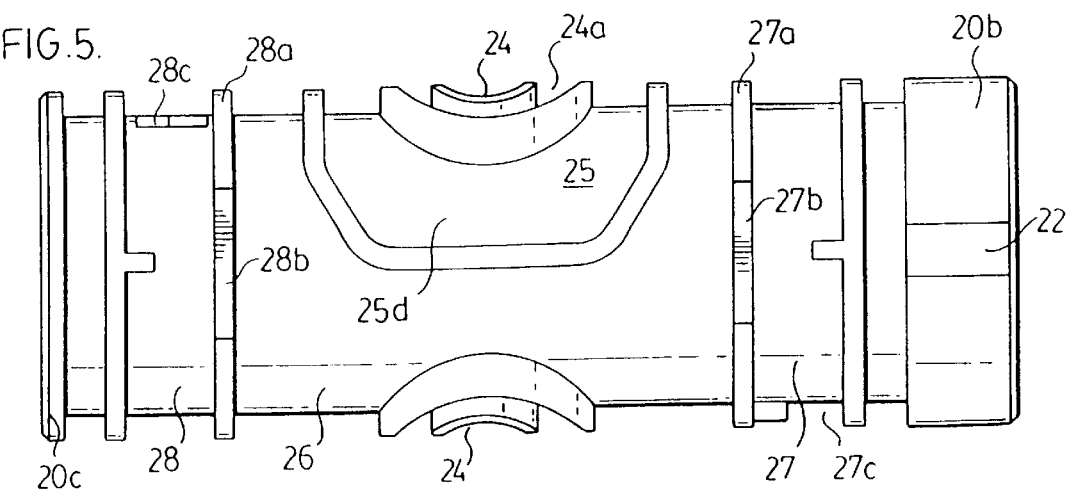

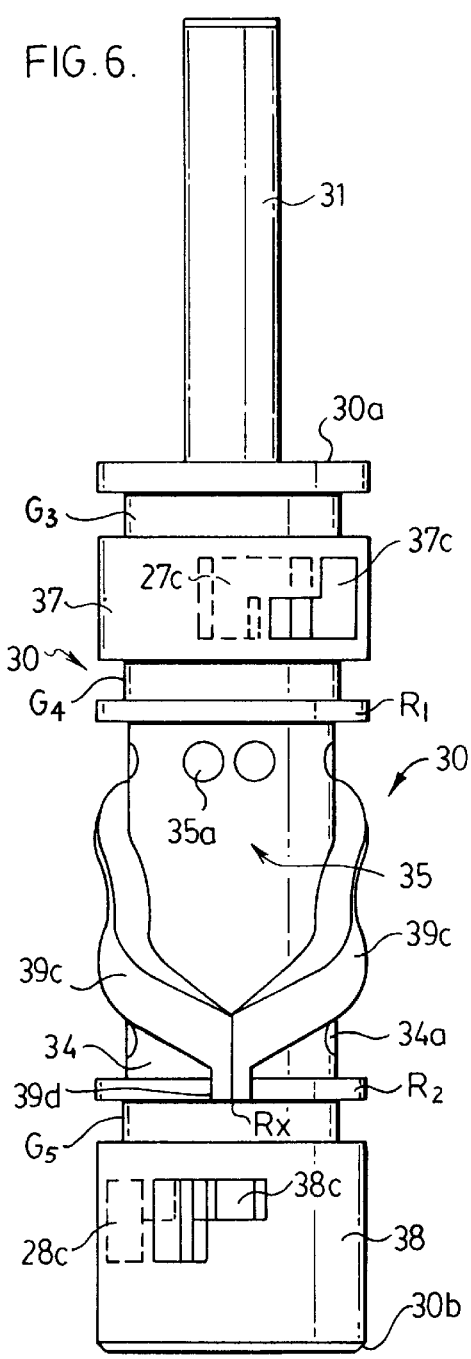
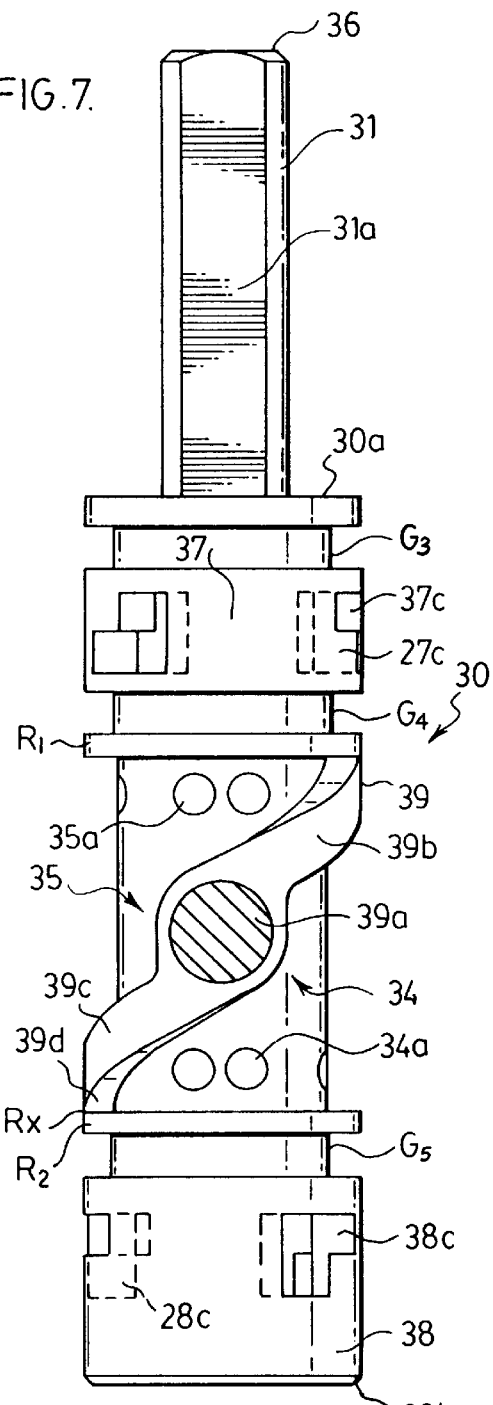
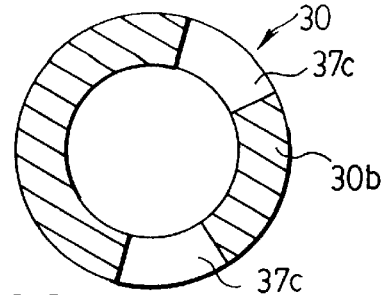
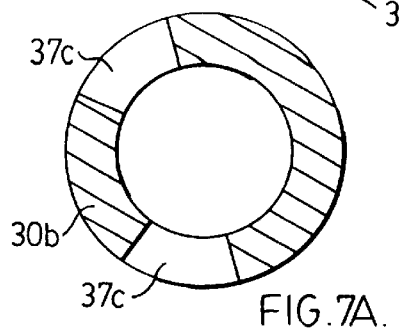

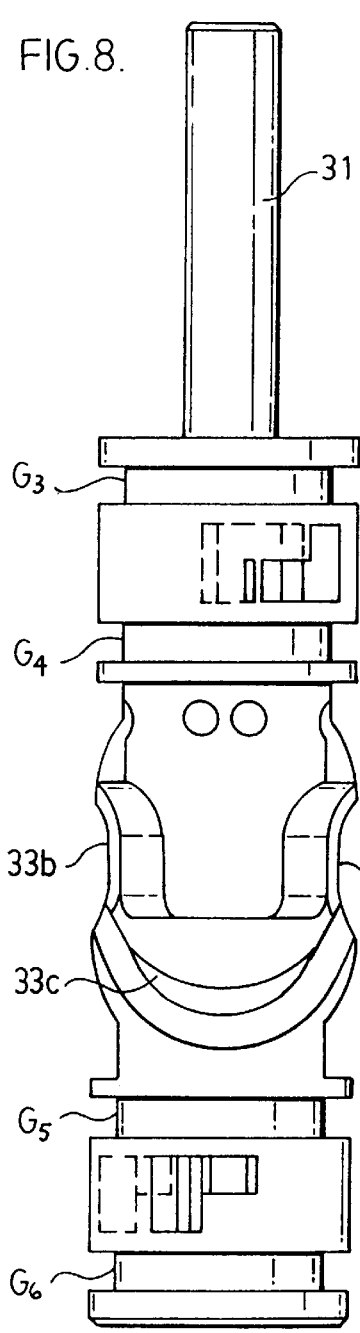
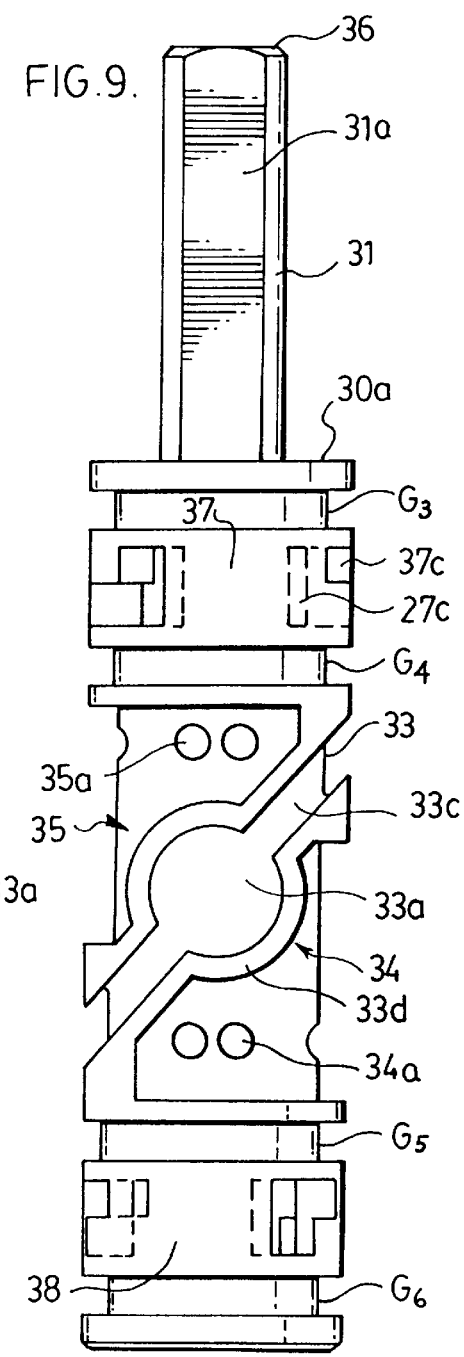
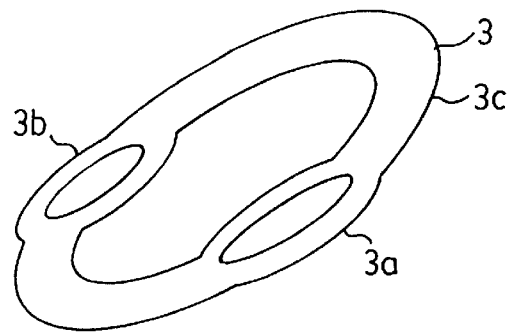

SINGLE LEVER VALVE AND CARTRIDGE WITH INTEGRAL MIXING CHAMBER AND DIVIDED WATERWAY

FIELD OF INVENTION

This invention relates to valves such as Single Lever Spool Valves. More specifically, this invention finds application to bathtub, bidette, shower or sink valves.

BACKGROUND OF THE INVENTION

A large number of cartridge valves are found in the prior art. Some of these valves are reciprocal type valves providing adjustment of volume. Other valves are mixing or cycle valves which mix a preset volume of hot and cold water together which mixes the fluid exiting the valve at a desired temperature. Further, other valves combine both functions being reciprocating valves and temperature adjustable valves.

Some of the aforementioned valves include a pressure balancing spool therein to compensate for a change in the pressure of either the hot or the cold water feed lines. This structure is known in the art and may be embodied in either a mixing cycle valve, or a reciprocal valve, and in combinations thereof.

Examples of valves which are reciprocal and rotatable are found in U.S. Reissue Pat. No. 25,920 to Moen, U.S. Pat. Nos. 4,330,011 to Moen, 3,730,222 to Moen. These patents describe various forms of cartridges which may be used with a single lever valve. Alternatively, U.S. Pat. No. 4,469,121 to Moen describes the use of a pressure balancing spool in a cycle valve which is non-reciprocating and has no provision for volume control.

U.S. Pat. No. 4,033,370 to Egli teaches a mixing valve for control of water temperature and pressure as well as the volume of the water discharged from the valve. A pressure balancing spool is incorporated with the valve which spool includes a rubber sleeve such as best seen in FIG. 4 which has fins and ribs which extend outwardly away from the spool portion and provide a seal against an adjacent surface.

U.S. Pat. No. 2,308,127 to Symmons describes a non-scald mixing valve which is reciprocal and also rotatable in a valve housing, and includes a pressure balancing member within a hollow in the center of the valve which compensates for the changes in pressure in either the hot or the cold water lines. U.S. Pat. No. 3,448,755 further describes a valve by Symmons with an improved volume control. U.S. Pat. Nos. 3,960,016 and 4,917,137 further describe improvements to Symmons' pressure balancing concept.

Alternative types of sealing have been provided for these cartridges in order to minimize the effect of the grit found in the hot water stream, in particular, which may cut the seal if the seal were left in the direct path of the waterflow. U.S. Pat. No. 4,395,018 describes such a seal which seal is positioned on a sleeve out of the path of flow with the stem outlet port being closed by the seal member when the valve is in a closed position. The seal is a generally well known seal of the "O" Ring type.

Applicant is also aware of the following Patents:

U.S. Pat. No. 3,814,120, Canadian Letters Patent 1,052,229, U.S. Pat. Nos. 4,813,455, 4,782,853, Canadian Letters Patent 1,293,175 to the present inventor, Canadian Letters Patent 978,050, Canadian Letters Patent 1,151,629, U.S. Pat. No. 4,183,376 and Canadian Letters Patent 1,116,581.

From the above referenced patents of particular interest is Canadian Letters Patent 1,052,229 with reference to FIG. 7, showing a snap ring 35.

Further U.S. Pat. No. 4,813,455 at FIG. 6, describes a safety device which is adjustable within a mixing valve.

The present inventor's Canadian Patent 1,293,175 refers to a set of concentric cylinders, as best seen in FIG. 1, wherein multiple openings around the circumference of a cylinder are used. Further, U.S. Pat. No. 5,275,195 describes a system of seals for the inlet and outlet of a spool valve.

Canadian Patent 1,151,629 at FIGS. 6 and 9, illustrates a stop used with a simple valve. Many of the remaining listed patents teach valves having concentric spools therewithin.

Nowhere within the prior art is there found a cartridge for a kitchen, lavatory, or shower valve which cartridge is contained in a standardized housing in use and may include a pressure balancing spool, an internal mixing chamber, or a separation of the water paths, all of which cartridges are replaceable in a standardized housing. Should the user of the valve desire to replace a standard valve which has a mixing chamber only with a pressure balancing spool, the user merely installs the appropriate cartridge and the installation is complete. Therefore, there will be no requirement for removing the old housing or sleeve and the necessary repairs to the adjacent area around the valve. Further this invention incorporates a unique stationary sleeve unknown in the prior art which sleeve is formed as a body having means located therewith which work in cooperation with the standardized housing to obviate the need to provide a venturi type restriction portion adjacent the outlet of the valve nearest the shower. The tub outlet is therefore always favoured as an outlet unless the shower diverter is positioned to the shower position. Further provision is made with the cartridge that allows for the reversing of the cartridge without the necessity to shutoff the water supply thereto or the need for separate check valve or to remove the cartridge from the body.

Also nowhere within the prior art is there found a cartridge for a standardized valve housing, which cartridge with the exception of the inlets and outlets of the housing includes all of the necessary waterways formed therewith which may include any necessary mixing chambers. All of the aforementioned prior art includes coaxial sleeves with alignable openings moveable in a housing to allow water to enter and/or exit the sleeves, or a reciprocal and rotatable plug with holes alignable with waterways defined in the housing.

It is therefore a primary object of this invention to provide a standardized cartridge for a valve housing which offers the advantage of replacing a valve cartridge of one function with a valve cartridge with enhanced functions.

It is a further object of this invention to provide a valve cartridge containing a unique seal which is positioned out of line with the waterflow when the cartridge is operative.

It is another object of the invention to provide a valve assembly including a standard housing which includes a cartridge member contained therein in use, the cartridge including all of the waterways required for the operation of the valve.

It is yet a further object of the invention to provide a stationary sleeve for a cartridge for a valve assembly which sleeve when positioned with the cartridge in the standardized housing obviates the need for a restrictor in the valve housing adjacent the shower outlet for the operation of the valve.

It is yet still a farther object of the invention to provide an outer stationary body sleeve for a cartridge for a valve assembly which sleeve when installed with the cartridge in a housing provides automatically and reversibly with the waterways, (for example a mixing chamber required for the operation of the valve), means disposed with the sleeve to provide in an installation having two or more selective outlets an automatic preference, for use with a known diverting devices, of the waterflow to a predetermined outlet, for example the bathtub over the shower, without the need for there to be provided a restriction in the housing proximate the outlet to the shower and without the need for reversing the housing if the installation by an installer were reversed.

It is yet a further object of the invention to provide a significant improvement in the volume of water available through the valve both as hot or cold or mixed.

It is yet a further object of the invention to provide with a valve assembly a total available flow at the outlet of the valve of one hundred percent of either the hot or cold water valve input to the valve or mixtures thereof, without any choking of available supply through the valve.

It is a further object of the invention to provide an adjustable safety position to control the amount of hot water supply through the valve if utilized in institutions such as hospitals and schools or the like.

It is an important object of this invention to provide a stationary sleeve for use with a cartridge assembly, which sleeve includes the necessary hot and cold waterways and mixing chambers between its perimeter and the standard housing.

It is another object of this invention to provide a simple path from the valve to divert water from the spout to the showerhead. This allows a simple housing to be utilized.

It is a further object of this invention to provide a cartridge which is reversible without being removed from the valve, and without shutting off the water supply.

It is a further object of this invention to provide a housing which includes aligned inlets and outlets, positioned in one plane around the housing.

Further and other objects of this invention will become apparent to a man skilled in the art when considering the following summary of the invention and detailed description of the preferred embodiments of the invention illustrated herein.

SUMMARY OF THE INVENTION

According to one aspect of the invention there is provided a valve assembly comprising a standard housing having an opening for receiving a cartridge, the housing having two inlets and two outlets, preferably the inlets and outlets being disposed in the same horizontal plane (preferably axially aligned), and in one embodiment the outlet to the tub spout is bifurcated, by a separating wall having an edge, said housing having a cartridge contained within the housing opening, the cartridge including a stationary body sleeve having a perimeter and disposed within the opening of the housing and having inlet means in alignment with the inlets of said housing for allowing water to enter the valve assembly and for retaining water separating sealing means adjacent thereto, the stationary sleeve having means for obviating the need for a flow restrictor, (such as a venturi fitting) in the valve housing adjacent the outlet leading to shower for the correct operation of the valve, (preferably said means for obviating the need for a flow restrictor being a restricted passage provided between the perimeter of the stationary sleeve and the housing, preferably created by a rib raised laterally away from the sleeve towards the housing or the like thus providing a waterway and mixing chamber between the perimeter of the sleeve and said housing which prevents water from flowing to the shower outlet in normal operation until a diverter on the spout outlet is operated said raised rib in part also sealing against the wall of the bifurcated outlet), the cartridge having a moveable stem member provided therewith and moveable within the housing and within the stationary body sleeve of the cartridge, the movable stem member having water inlet sealing means sealing against an inner wall portion of the stationary body sleeve, in one embodiment the moveable stem member includes a stem body within a stem sleeve press fit assembled forming the moveable stem member, the moveable stem member including cutouts, grooves, slots or the like, providing in cooperation with the inner wall of the stationary sleeve and the water inlet sealing means a path of waterflow into the stem member and preferably out of the stem member to a mixing chamber formed between the body sleeve and the housing; the valve assembly when assembled including all of the waterways required for the operation of the valve. In one embodiment the cartridge includes a pressure balancing spool. Preferably the stem member includes a large inlet waterway to enhance the operations of the pressure balancing spool.

According to yet another aspect of the invention there is provided for use in a valve assembly having a standard housing, a cartridge in use contained within an opening within the housing, the cartridge comprising a stationary sleeve disposed within the housing and having inlet means and means for retaining inlet sealing means adjacent said inlet means, the sleeve having therein disposed a moveable stem member moveable within the stationary sleeve (preferably the moveable stem member being rotatable but nonreciprocal), the moveable stem member, (in a preferred embodiment said member includes a stem sleeve which is preferably press fit with a stem body), includes cutouts, grooves, slots or the like wherein the combination of the interior of said stationary sleeve and said cutouts, grooves, slots or the like of said stem member defining the path of waterflow into the moveable stem member and out of the moveable stem member to a mixing chamber formed between the perimeter of the stationary body sleeve and the housing, the cartridge when assembled with the housing including all of the waterways required for the operation of the valve. In one embodiment the stem cartridge includes a pressure balancing spool disposed within the stem member.

According to still yet another aspect of the invention there is provided a valve cartridge for a valve housing, the housing having an opening therein for receiving the cartridge in use and an inner wall surrounding the opening, the housing having fluid ports defined therewith to provide a fluid path to and from to the cartridge in use; (preferably the fluid ports being disposed in the same horizontal plane and preferably being axially aligned);

the valve cartridge comprising a stationary body sleeve for carrying water sealing means, the stationary sleeve having inlets and outlets provided therewith, preferably said water sealing means being disposed adjacent said inlets, preferably the stationary sleeve when assembled with the housing and the cartridge providing automatically and reversibly the waterways of the valve cartridge, (for example a mixing chamber required for the operation of the valve, and the inlet and outlet waterways or the like), said cartridge having disposed therewith means disposed with the sleeve in combination with a bifurcated outlet formed by a wall having an edge and disposed with the housing to provide in an installation having two selective outlets in combination with the diverter normally provided with a spout for a bath an automatic waterflow from the valve cartridge to the bifurcated housing outlet, (for example the bathtub over the shower) without the need for there to be provided a restriction (for example a venturi fitting) in the housing proximate the outlet leading to the shower and without the need for reversing the housing if the installation by an installer were reversed, (in this example the cartridge stem would simply be rotated 180 degrees to compensate for the installation error), preferably the means disposed with the sleeve preferably being a continuous rib or the like, raised laterally away from the surface of the stationary sleeve toward the housing and sealing in part against the edge of said wall and providing a direct path to the outlet leading to the tub only during normal output flow to the spout, the valve cartridge having a stem moveably contained within to the stationary body sleeve and including an outer substantially hollow stem having an inner and outer surface and having inlets and outlets for selective (rotatable) engagement in use with the inlet waterways and outlets of the stationary body sleeve and the housing, (and in one embodiment also containing a (preferably hollow) sleeve contained within the hollow stem also having an inner and outer surface and having inlets and outlets), the stem also carrying a water path separating and sealing means extending towards the stationary body sleeve and being disposed proximate the inlets of the stem for selective engagement with the inlet of the stationary body sleeve or the surface of the interior of the stationary body sleeve, in one embodiment said sealing means including a central portion provided with the stem carrying the main inlet seal and for engagement with the inlet of the stationary sleeve and a supplementary member extending laterally away from the sides of the central portion of the stem towards a locking slot provided with the stem, the stem including proximate the outer surface thereof cutouts, slots and grooves or the like, wherein in use there is created waterways, in combination with the interior of the stationary sleeves providing the necessary waterways for the functioning of said cartridge, preferably the stem body and stem sleeve forming the stem by preferably being press fit together, the stem being moveable (and preferably rotatable and non-reciprocal) within the stationary body sleeve and including with the stationary body sleeve and the housing all of the waterways required for the operation of the valve in use, (preferably said hollow of said stem and preferably said stem body containing a pressure balancing spool).

In yet another aspect of the inventions defined in the last three paragraphs the preferred stem sleeve of the stem cartridge in use may further comprise an at least first inlet, and at least a first outlet, the stem sleeve carrying an inlet sealing portion including a first seal to seal against the inlet of the stationary sleeve, and a second seal to separate and retain the integrity of the separate waterways disposed between the interior of the stationary sleeve and the perimeter of the stem sleeve, preferably said first seal being generally circular in form and being raised laterally toward the stationary sleeve from a seat therefore provided with the stem sleeve and to abut the inner surface of the stationary body sleeve, the sealing portion having a second preferably grommet-type seal extending laterally and preferably diagonally away from the first seal and from the seat therefore for engaging the inner wall of the stationary body sleeve and thereby separating the waterways of the cartridge (for example the hot and cold waterways), the sealing portion presenting a sealing surface for selective alignment with an inlet of the cartridge when the stem member is moved (preferably by rotation) between the valve closed and open positions, wherein at the closed position the first seal is positioned proximate the inlet of the stationary sleeve of the cartridge, and the second seal abuts the inner wall of the stationary sleeve proximate the inlet seal of the body sleeve thus respectively preventing fluid from entering the cartridge and preventing fluid from crossing over waterpaths in the cartridge when in the open position, the stem member further being moveable to and from selective valve opened positions whereat the first seal is moved out of alignment with the inlet of the stationary sleeve and the second seal abuts the interior of the stationary sleeve separating the waterways and at these opened positions the outlet of the stem member overlapping all or part of the outlet of the stationary sleeve, in a preferred embodiment the outlets of the sleeve lagging the outlets of the stem by a predetermined number of degrees about the circumference of the cartridge, the raised portions of the seal portion abutting the inner wall of the stationary body sleeve away from the direct fluid flow path and thus allowing fluid to enter and exit the cartridge and whereat the seal portion has moved partially or totally away from stationary sleeve inlet with the first seal of the seal portion positioned to allow fluid to enter the cartridge. Preferably the second portion of the seal extends diagonally from the first portion when installed on the cartridge, either as a continuous member therefrom extending from one side of the first seal to the other about the perimeter of the stem member, or alternatively extending from the edges of the first seal to locking slots within the perimeter of the stem member.

According to yet another aspect of the invention there is provided a stationary body sleeve for use with a housing and a stem cartridge contained within a valve assembly, said stationary body sleeve comprising a hollow cylinder having an exterior and an interior and having openings for inlets and outlets extending from the exterior to the interior, the hollow cylinder having sealing means retaining portions, such as seats, for "O" rings or the like, for retaining sealing means in use to ensure the integrity of separate waterways for a valve assembly incorporating the hollow cylinder, the stationary body sleeve having means disposed with the sleeve to provide in an installation having two selective outlets along with the surfaces of the housing, a reversible automatic waterflow to a predetermined selective outlet, (for example a bathtub over a shower, and without the need for reversing the installation of a housing if the installation by an installer was reversed in error, corrected simply by rotating the cartridge stem contained within the stationary sleeve 180 degrees,) preferably the automatic waterflow being provided by a preferably continuous rib, raised laterally toward the housing when installed and in combination with the housing surface.

According to yet another aspect of the invention there is provided for use with a known diverting device to divert the flow of water for example from the bathtub to the shower, a reversible stationary body sleeve for a cartridge for a valve assembly, to provide in an installation having two selective outlets an automatic flow to a predetermined outlet without the need for there to be provided a venturi in the housing proximate the outlet to the shower and without the need for reversing the housing if the installation by an installer were reversed wherein the sleeve when assembled with the cartridge therefore provides automatically and reversibly with the interior of the housing, the waterways of the cartridge (for example, a mixing chamber required for the operation of the valve).

The specification above describes assemblies for shower valves and lavatory valve assemblies, or the like. Those skilled in the art will immediately recognize the advantages of the many embodiments of the invention and appreciate the broad application of the teachings thereof and specifically the advantage in using a standard housing for a valve wherein all of the features of the valve are embodied within a cartridge itself. For example if one were to desire a pressure balancing feature in a shower valve cartridge originally installed without the feature but contained in the standard housing, one would merely replace the cartridge originally installed, with the cartridge including the pressure balancing feature. This of course would be accomplished simply by replacing the cartridge and without the need for installing a new housing. In order to accomplish this, a unique removable retainer design provided with the cartridge removeably abuts under a retaining shoulder provided with the stem member to retain the cartridge in use and to allow for ease of removal of the cartridge and reinstallation of a new cartridge in the same housing. Further, a supplementary safety device may be provided with the valve to limit the rotation of the stem member to prevent scalding. Preferably the design of the cartridge is provided with predetermined waterways to allow for easy correction of the valve position if the installer makes an error and reverses the waterflow as labeled on the handles of the valve. By removing the removeable retainer the cartridge may be reversed without shutting off the water by rotation of the stem member 180 degrees, when the retainer is removed, allowing for uninhibited movement of the stem member outside of the limitations of the retainer without the need to shut off the water or remove the cartridge from the housing whereat thereafter the retainer is reinstalled.

Therefore there is provided a valve comprising a standard housing and a replaceable standard sized valve cartridge, said cartridge having a retaining shoulder provided therewith, the valve including a removable retainer preferably a ring preferably made of spring steel, provided with the valve cartridge for abutting under the retaining shoulder provided with the cartridge and preferably with a stationary sleeve proximate the top thereof to retain the cartridge in use, said retainer also for retaining a supplementary safety and comfort device provided with the valve to limit the cartridge in movement within the housing and to allow for ease of removal of the cartridge and reinstallation of a new cartridge in the same housing, the cartridge including predetermined waterways disposed between said housing and said stationary sleeve and said stationary sleeve and stem member to allow for easy correction of the valve position if the installer makes an error and reverses the waterflow as labeled on the handles of the valve, the correction being effected by removing the retainer and if present the supplementary safety device to enable the valve to be reversed without shutting off the water supply, wherein rotation of the stem 180 degrees, when the retainer and if present the safety device are removed, allows for uninhibited movement of the cartridge outside of the limitations of the safety device whereby the waterways may be reversed without the need to shutoff the water or remove the cartridge from the housing whereat thereafter the retainer and the preferred safety device are reinstalled. Preferably said safety and comfort device including a first member for removable fixed installation on the stem spindle of the cartridge, said first member including a tongue extending laterally therefrom, the safety device having a second member for removable non-interfering installation about said stem spindle, said second member having disposed proximate the bottom thereof detent portions and preferably teeth disposed about a predetermined number of degrees and preferably providing a first adjustable high limit temperature stop for use in combination with the tongue of the first member to establish preselected comfort zones for the valve, the top of said stationary sleeve having disposed therewith detent portions and preferably teeth for mating with the detent of said second member and for providing a primary fixed off position stop, wherein the high limit and primary stops of the second member and the stationary sleeve may be engaged by said tongue of said first member to limit the motion of the valve between the closed and open positions, said stops being adjustable in position by the user defined positions with the engagement of the detents of the second member with the detents of the cartridge and preferably the moveable sleeve, wherein when the user wishes to change the stop portions of the valve should the water temperature wish to be controlled and lowered in temperature at the valve outlet, the user will remove the retainer and rotate the second member of the safety device a predetermined number of degrees to alter the position of the high limit stop to adjust and select the desired water temperature, wherein the retainer will be reinstalled and the stem will be further limited in rotation by the engagement of the tongue with the stops.

According to a preferred embodiment of the invention, there is provided a valve assembly comprising a housing having a top and bottom and having disposed between its top and bottom an opening wherein a cartridge is inserted, said housing having inlets and outlets for hot and cold water, said housing carrying a cartridge in use, said cartridge including portions which are moveable in relation to said housing, said cartridge including a stationary sleeve having a first area and a second area and inlets and outlets, and an interior smooth surface, said cartridge having disposed within said stationary sleeve a moveable stem member which is rotatable and preferably non-reciprocal, said moveable stem member having a perimeter, and having disposed about its perimeter a first and second area separated by a compound sealing means, said sealing means including a first primary sealing portion for sealing the inlet of the stationary sleeve and a secondary sealing means for creating a first cold and second hot chamber area of the moveable stem member, said moveable stem member having disposed therewith inlets for allowing water to pass into the center thereof, wherein there may be contained a pressure balancing spool or a water separating plug, preferably the outlets of said moveable stem and said stationary sleeve being substantially L-shaped, an inverted L-shape which are selectively alignable to provide for selecting temperature and a controlled volume of water through the valve assembly and preferably increasing flow capability above known devices, said housing including in the outlet to the bathtub a dividing dam bifurcating the cross section of the outlet, wherein when water enters the valve assembly the first and second chamber of the moveable stem member will maintain separation of the waterways for hot and cold water, and wherein the first and second mixing chambers of the stationary sleeve will provide the necessary waterways for water exiting the valve, said first mixing chamber of said stationary sleeve being in alignment with the outlet from said stationary sleeve to provide in combination with the interior of said housing opening a waterway and mixing chamber to provide a path for mixed water to exit through the tub spout and in one embodiment through one half of the bifurcated cross section of the tub outlet, and wherein when a diverting mechanism is operated typically found on the spout of a tub, the water exiting the spout will be diverted back over the dividing dam into a second shower sectional area of the bifurcated outlet back into a second shower chamber of the stationary sleeve and the waterway provided thereby between the sleeve and the housing, and through to the outlet to the shower which is in communication with the second area. Therefore, in the preferred embodiment there is provided a valve assembly wherein waterflow from the first area is generally in communication with the tub outlet of the valve, waterflow from and the second area is generally in communication with the shower outlet of the valve, only when the diverting mechanism is operated. Otherwise, the second area is short circuited from the operation of the valve assembly. In this regard, the need for a venturi in the housing is therefore obviated in that the water cannot reach the shower outlet until such time as the diverter is operated.

According to yet another aspect of the invention, there is provided a valve assembly including a housing having a top and bottom and having disposed between its top and bottom an opening wherein a cartridge is inserted. The housing has axially aligned inlets and outlets for hot and cold water, and carries a cartridge. The cartridge includes portions which are moveable in relation to said housing and a stationary sleeve having a first area and a second area and inlets and outlets, and an interior smooth surface. The cartridge has disposed within the stationary sleeve a moveable stem member which is rotatable and preferably non-reciprocal. The moveable stem member has a perimeter, and has disposed about its perimeter a first and second chamber area separated by a compound seal. The seal includes a first primary sealing portion for sealing the inlet of the stationary sleeve and a secondary seal portion for separating the first and second chamber areas of the moveable stem member. The moveable stem member has disposed therewith inlets for allowing water to pass into the center thereof, wherein there may be contained a pressure balancing spool or a water separating plug. Preferably the outlets of said moveable stem and said stationary sleeve being substantially L-shaped, and inverted L-shaped respectively, which are selectively alignable to provide for an increased volume of water through the valve assembly. The housing includes a dividing dam in the outlet to the bathtub, for example a bifurcated cross section, wherein when water enters the valve assembly the first and second chamber area of the moveable stem member will maintain separation of the waterways for the first chamber area for cold water and the second chamber area for the hot water, and wherein the first and second chamber areas of the stationary sleeve will provide the necessary waterways for water exiting the valve. Waterflow from the first waterway area of the stationary sleeve being in alignment with the outlet from said stationary sleeve to provide in combination with the interior of said housing opening a waterway and mixing chamber to provide a path for mixed cold and hot water to exit through the tub outlet. When a diverting plug type mechanism is operated, typically found on the spout outlet of a tub, the water exiting the spout will be diverted back and over the dividing dam into the second cross sectional area of the bifurcated outlet back into the second waterway area of the stationary sleeve, such waterway area provided thereby between the sleeve and the housing, will divert the water up to the shower outlet.

BRIEF DESCRIPTION OF THE DRAWINGS

FIGS. 3, 4 and 5 are various side views of the stationary sleeve included with the valve assembly illustrating the various components of said sleeve and illustrated in a preferred embodiment of the invention.

FIGS. 6 and 7 are side perspective views of the moveable stem member illustrating the components thereof and illustrated in a preferred embodiment of the invention.

FIGS. 8 and 9 are alternative embodiments of the stem member of the valve assembly.

FIG. 9A is an alternative seal used in the assembly of FIGS. 8 and 9.

DETAILED DESCRIPTION OF THE PREFERRED EMBODIMENTS

Figure 1:
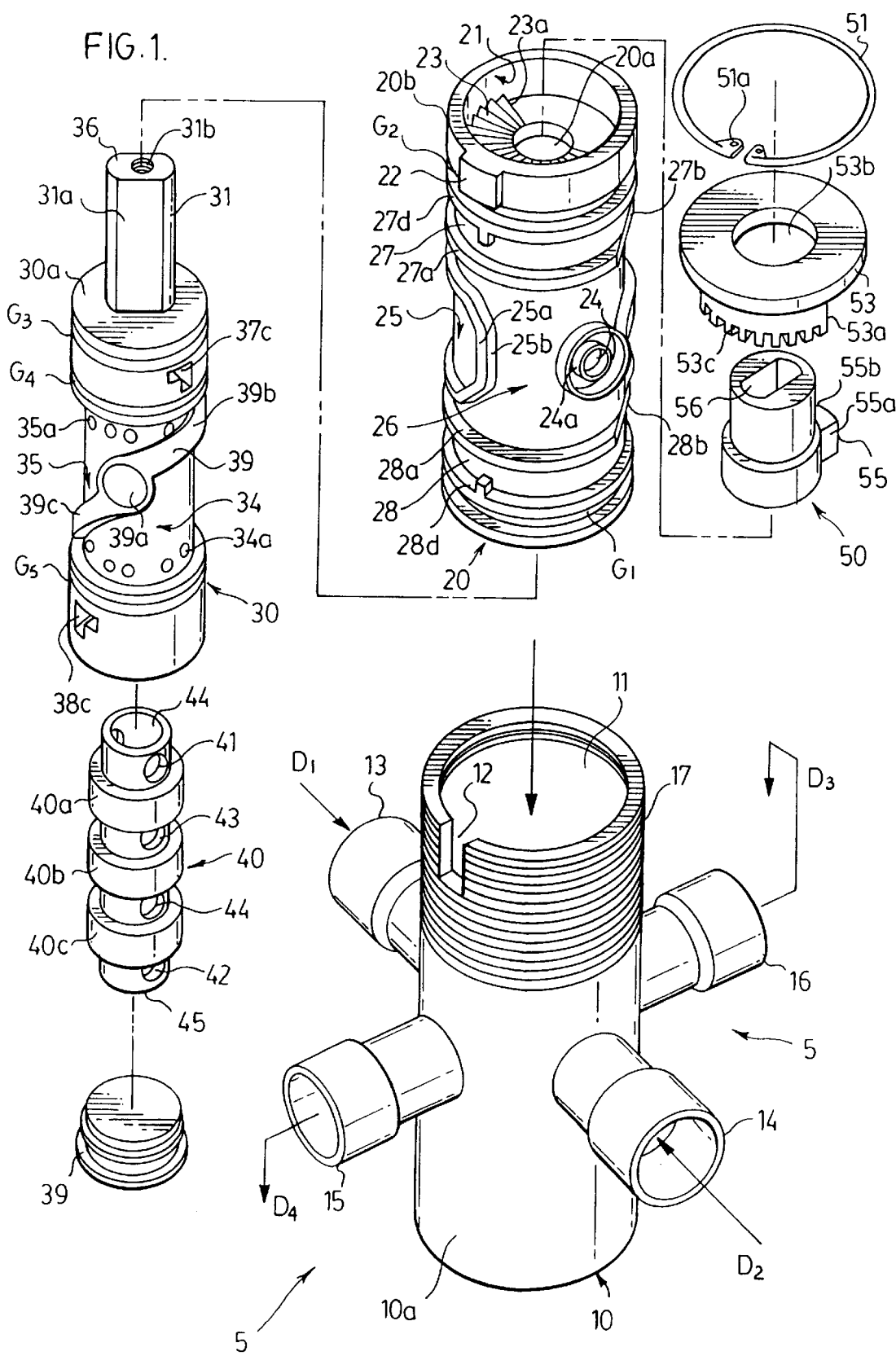
FIG. 1 is an exploded perspective view of the components making up the valve assembly and illustrated in a preferred embodiment of the invention.

Referring generally to the Figures, there is illustrated a unique valve assembly 5 which may be generally referred to as a spool valve assembly which includes a housing 10, and a stationary sleeve 20 for insertion within the opening 11 of the housing 10. The stationary sleeve 10 has a top 20b wherein an opening 20a is contained. The opening 20a allows the passage in use of the moveable stem member 30 through the opening 20a so that the stem portion 31 extends through said opening. The stem member 30 therefore is rotatable within the stationary sleeve within the limits of stop members incorporated with a safety device 50 which will be described hereinafter. The bottom of the moveable stem member 30 includes an opening wherein a pressure balancing spool 40 is contained. The pressure ballancing spool operates in the manner typically well known in the art. A cap portion 39 closes the opening at the bottom of the stem member 30.

Alternatively, the hollow containing the pressure balancing spool within the stem member may contain a plug which separates the waterways of the valve assembly, or it alternatively may contain a thermostatic member which compensates for the temperature of the water exiting the valve assembly. Such devices are well known and will not be described here. Essentially therefore, the cartridge assembly and the housing therefore are designed to be standardized. By standardized, it is meant that a cartridge having alternative features but standard size may be provided with a standard housing wherein the cartridge is assembled with the housing in the identical manner regardless of the features contained within the cartridge assembly. The cartridge assembly therefore may in combination with the housing provide for shower valve assemblies which are required by Code now in the Province of Ontario to include a pressure balancing assembly, lavatory valves installed in bathroom sinks or tubs which may include a cartridge assembly not including a pressure balancing spool, kitchen faucet cartridges, and any other installations where a single lever assembly is desirable.

Typically in the past, when considering replacing a valve assembly, for example in a shower, the entire housing must be removed. This can be quite an expensive process for the home owner in that not only is it a requirement to remove the housing, but there is also often a number of repairs which must be made to the adjacent wall surfaces to the housing in order to access the housing. This invention therefore substantially reduces the amount of damage done to the surrounding wall area when a valve assembly of the present invention is already installed with the shower but requires repairs or replacement of the cartridge.

Further, within known shower valve assemblies, it is well known that a venturi-type reduction fitting is installed in the outlet within the housing which is required for the correct operation of the valve assembly and creates a back pressure biasing the water flow against the shower assembly outlet as is well known. Therefore, in manufacturing housings for such valve assemblies, an additional step is required to insert and fix this venturi fitting in position.

The housing of the present invention has a top and a bottom and has contained within the top a generally circular opening 11 wherein the cartridge is received in use. The housing is manufactured identically for each application. The housing 10 therefore includes inlets 13 and 14, and outlets 15 and 16 which are disposed on a substantially identical horizontal plane, but at 90° to one another. The inlets 13 and 14 therefore are utilized to allow hot and cold water into the valve assembly. The outlets are provided to allow for the passage of mixed hot and cold water, or alternatively 100% hot or 100% cold water from the valve assembly. Disposed proximate the top of the valve assembly is threaded portion 17 which allows for the addition of body trim portions to the valve assembly which will not be described within this specification. The reader is referred to the prior art for various forms of body trim which may be utilized. Further, the cartridge assembly, including the stem member 30, has an opening 31b provided proximate the stem handle portion 31. Any acceptable handle trim portion may be affixed therefore to this threaded opening 31b having the hot and cold indications provided proximate the top of the handle trim. These portions also will not be described within this specification.

The opening within the housing 10 extends from proximate the top adjacent the threaded portion 17 to proximate the bottom 10a of the housing assembly. This can be best seen in FIG. 2. The housing does not include any cutouts, slots or grooves within the internal opening 11. Cutouts, slots, grooves and the like are provided in the prior art devices to provide mixing chambers and waterways to the outlets of the valve assembly. This is not required with the present invention and therefore provides with the standardized housing 10 substantially smooth interior surface adjacent the opening 11 contained within the housing. The only portion provided with the assembly is a notch or a slot portion 12 disposed proximate the top of the housing in order to lock in place the cartridge assembly by receiving the compatibly shaped tab portion 22 disposed proximate the top of the stationary sleeve 20 within which the stem member 30 is moveably contained. This will therefore act as a reference to align all the features of the valve.

Figure 2:
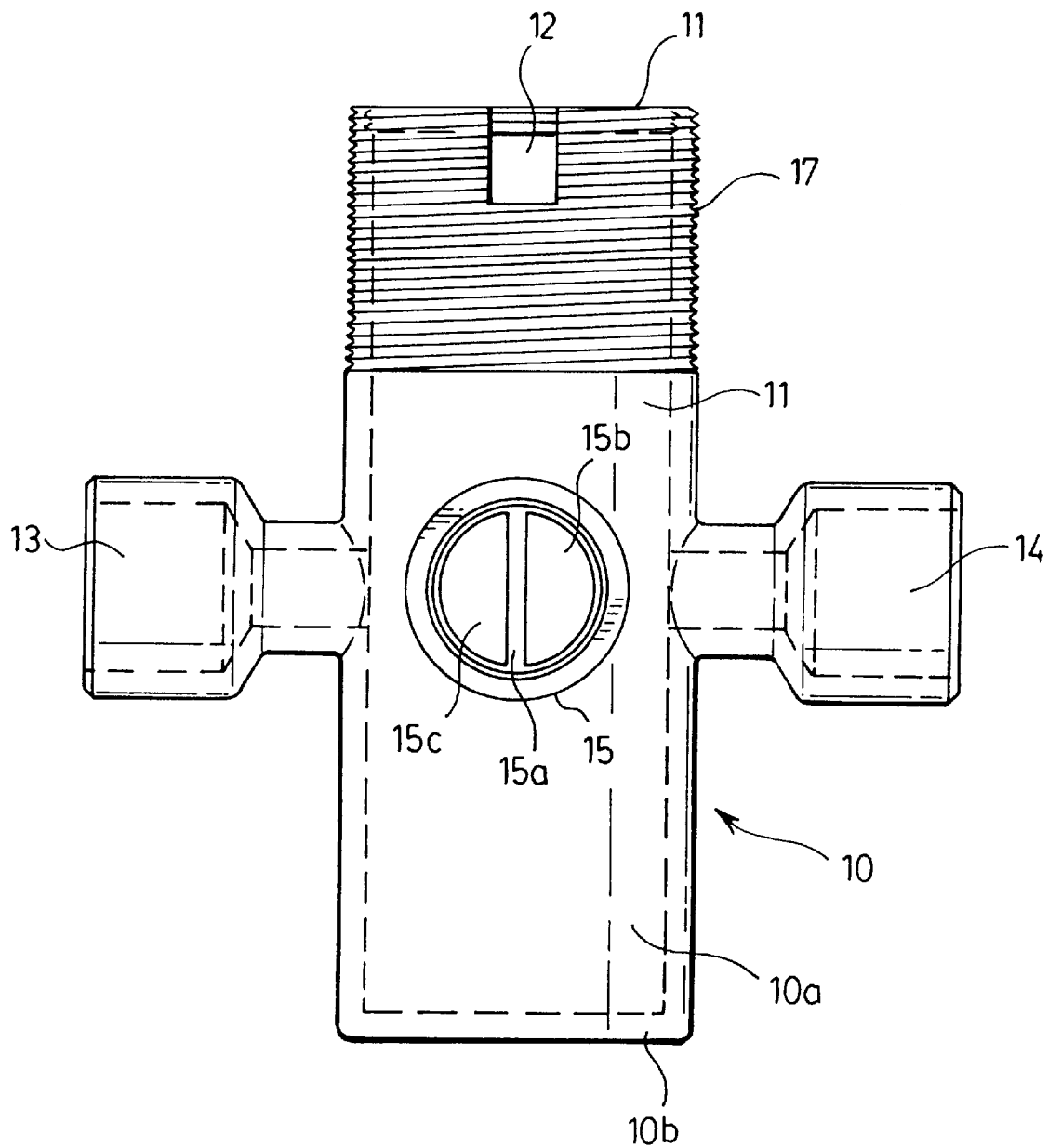
FIG. 2 is a side view of the valve housing of FIG. 1 when viewed from outlet 15 and illustrated in a preferred embodiment of the invention.

As best seen in FIG. 2, the outlet 15 differs substantially from the outlet 16. A generally vertically disposed wall portion 15a bifurcates the outlet 15 in cross section and therefore provides two separate halves 15b and 15c. Outlet 16 does not include such a limitation. As will be described hereinafter, the outlet 15 works in combination with the stationary sleeve 20 and the features provided therewith so as to provide the waterway between the interior wall of the housing adjacent the opening 11 and the stationary sleeve 20 and the various portions of its surface 25 and 26. The waterway provided by the area 26 and the housing therefore allows for water to exit through to the outlet 15b and to the bathtub typically. The combination of the interior of the housing and the waterway 25 allows for water to pass out through the outlet 15c when the shower diverter is closed to divert flow to the shower assembly. The water therefore upon hitting the diverter valve will re-enter the valve assembly through portion 15c which acts as an inlet and water will then enter the waterway defined between the housing and the stationary sleeve 20 at 25 and will pass around the sleeve therefore to the outlet 16 and exit the outlet 16 to the shower or other desired feature such as a telephone shower. The upstanding rib portion 25a which will be described hereinafter provides for separation of the waterway integrity by separating area 26 and area 25. The housing therefore is provided with this unique feature which operates in combination with the stationary sleeve to obviate the need for a venturi fitting in the housing.

As best seen in FIG. 1, a stationary sleeve 20 is therefore provided which fits within the housing 10 and extends to the bottom of the housing. However, prior to inserting the cartridge within the opening 11, the moveable stem 30 must be contained within the stationary sleeve 20. That is to say, the entire cartridge must be assembled and ready to be inserted within the assembly within the preferred embodiment. The stationary sleeve 20 therefore includes a top and a bottom and has disposed proximate the bottom thereof an opening, and proximate the top thereof an upwardly extending flange portion wherein a shoulder portion 21 is disposed. The shoulder portion 21 is typically for engaging the retaining clip 51. Further within the top of the stationary sleeve is provided an opening 20a for receiving the stem 31 of the stem member. The opening is larger than the stem handle portion 31 to allow free rotation therein. The top portion also includes adjacent to the opening 20a a series of detents or teeth 23 having an abutting stop member 23a provided proximate one end thereof. The detent members are as illustrated a plurality of teeth. These teeth interfit with the adjustable safety collar 53 proximate the teeth 53c thereof. The details of the safety mechanism will be described hereinafter. Also disposed proximate the top of said sleeve 20 is provided the tab portion 22 which was previously described for interfitting with the housing 10 proximate the notch 12. The sleeve includes two horizontally opposed (180 degree offset) inlets 24 surrounded by sealing members, typically O rings seated within the seal seat 24a. This seal therefore ensures the integrity of the waterflow into the valve assembly and that it is kept separate from the water exiting the valve assembly. Grooves G1 and G2 are provided proximate the bottom and top of the valve wherein a typical seal S1 and S2 is found. These sealing portions S1 and S2 are best seen in FIG. 12.

Figure 12:
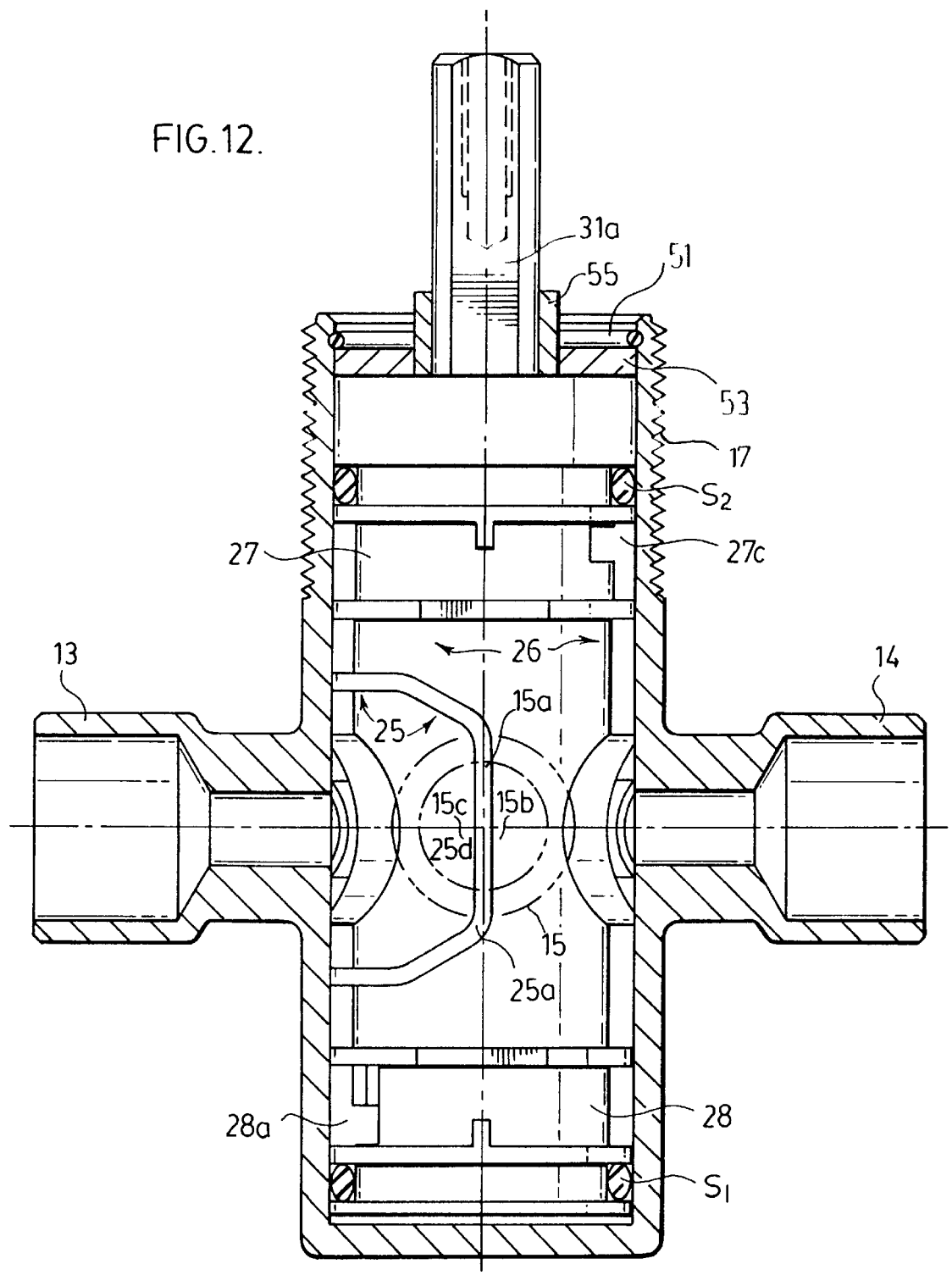
FIG. 12 is a schematic cut-away view through the center line of inlets 13, 14 illustrating the unique operation of the unique bifurcated outlet 15 and illustrated in a preferred embodiment of the invention.

Referring now to FIGS. 1, 5 and 12, the stationary sleeve 20 therefore includes outlet portions 27c and 28c provided within groove portions 27 and 28 which are defined by rib portions 27d, 27a, 28a and 28d respectively. The rib portion 27a includes a flattened portion 27b as best seen in FIG. 5 which allows for water exiting from outlets 27c and 28c to flow around the perimeter of the groove 27 contained within the housing 10 and provide a waterway for the exiting of the hot and cold water from the cartridge. The water therefore will travel along the waterway 27 and 28 until it reaches the flat spots 27b and 28b wherein it will pass over into the mixing chamber 26 defined between the groove portions 27a, 28a and 25a. This mixing chamber therefore is defined between the waterway 26 and the interior of the housing 10 to allow the hot and cold waters to be mixed and to allow water to exit the valve assembly when not in the closed position from outlet 15 or 16. A separate waterway 25 is defined by the rib 25a which extends essentially as shown in FIGS. 3, 4 and 5. This waterway 25 is defined between the interior of the housing 10 and the surface 25 of the stationary sleeve 20. The waterway 25 includes areas 25c and 25d which are isolated from waterway 26 by rib 25a and provide in combination with the standard housing and the bifurcated opening 15 the ability of the water to exit the valve to the tub or to the shower outlet at 16. This feature will be described in relation to the operation of the valve.

Figure 13:
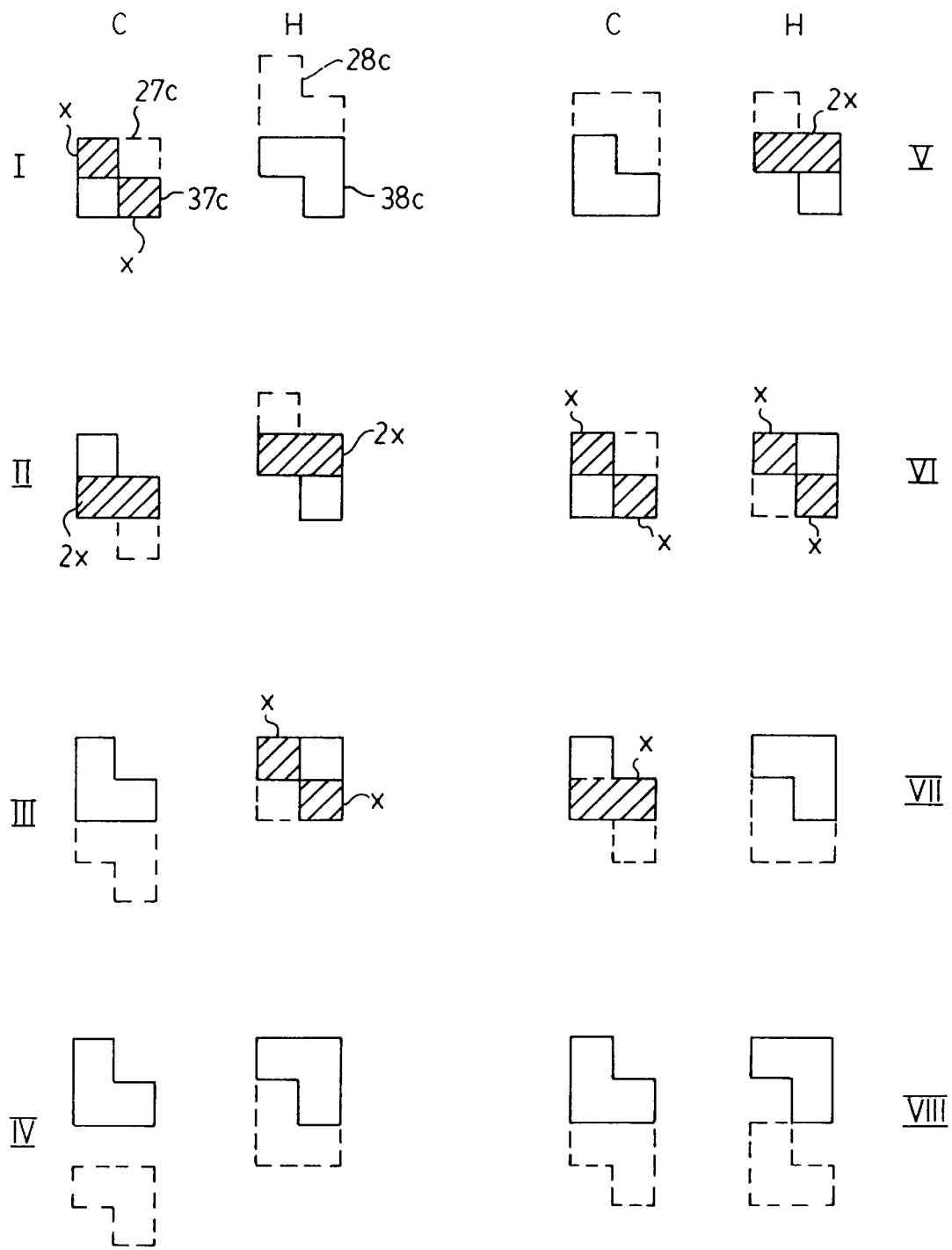
FIG. 13 is a schematic view of the overlapping of the outlets 28c and 38c of the stationary sleeve and moveable stem member and the various cross-sectional openings created as a result of the overlapping of these two outlets and illustrated in a preferred embodiment of the invention.
Figure 15:
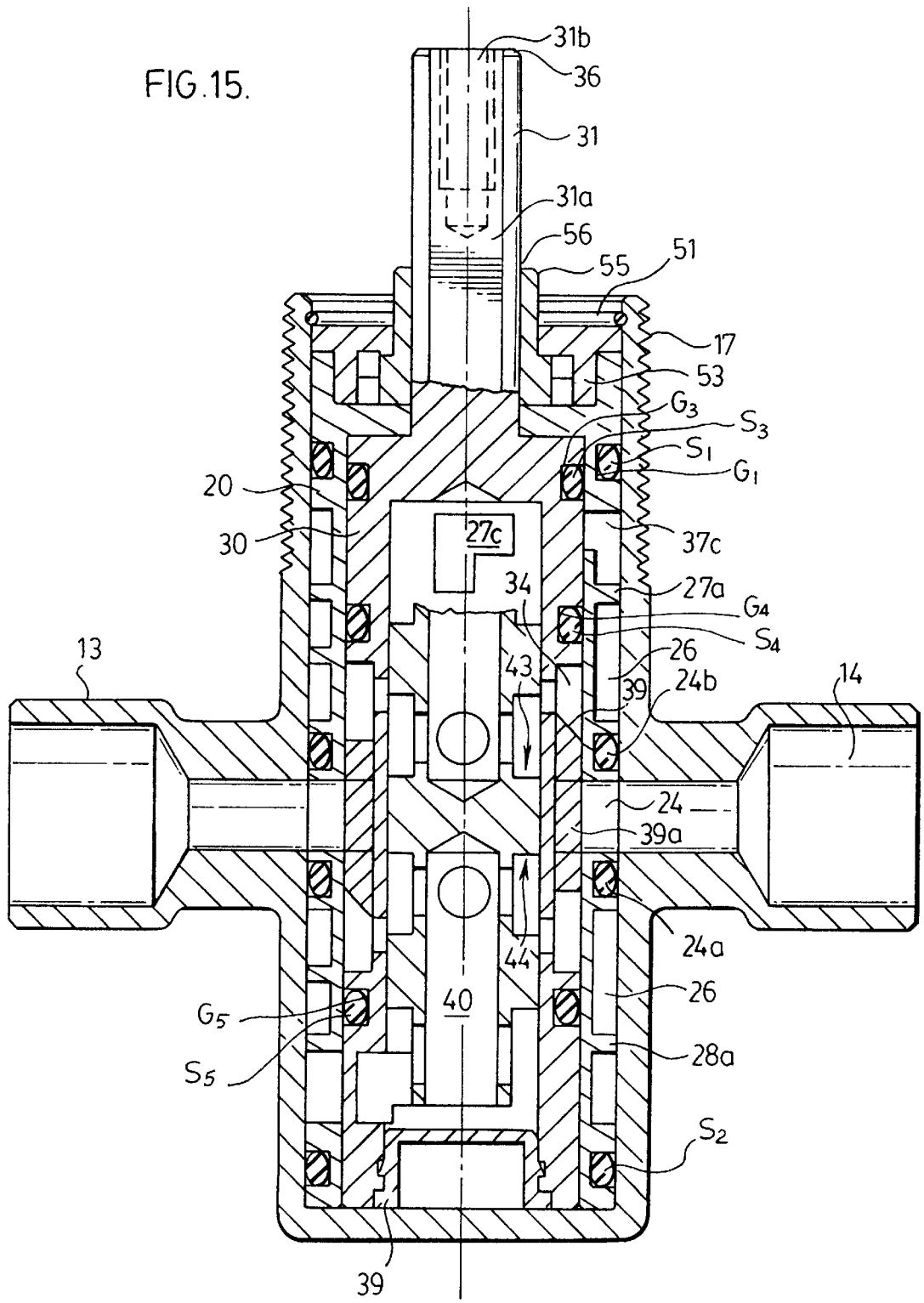

The inlet 24 therefore includes a seal seat 24a for a seal 24b as best seen in FIG. 15. The seat is defined between the annular walls 24c and wall 24d. These walls and the seal 24b provide for maintenance of the integrity of the waterway 25 which is utilized in combination with the outlet 16. As clearly as can be seen, the reduction in size of the rib area 27b and 28b allow for the passage of water from the groove 27 and 28 respectively into the waterway 26, and said waterway duplicating as a mixing chamber to mix the hot and cold water from the valve assembly. For the purposes of definition, it will be assumed that cold water exits from the outlet 27c and hot water exits from the outlet 28c. The outlets 27c and 28c have a substantially L-shaped configuration as best seen in relation to FIG. 4 and which outlets selectively align with the outlets 37c and 38c for the moveable stem member 30 as best seen in FIGS. 1, 6, 7 and 13. By the selective overlapping of the outlets an improvement in the output of the valve assembly in terms of total capacity or volume of waterflow results. As best seen in FIG. 13, the alignment of the openings 27c and 28c with the openings 37c and 38c will provide for at various positions 100% cold water at position I with 0% hot water, and 100% cold water and 100% hot water at position II. These positions will be referred to hereinafter.

Figure 14:
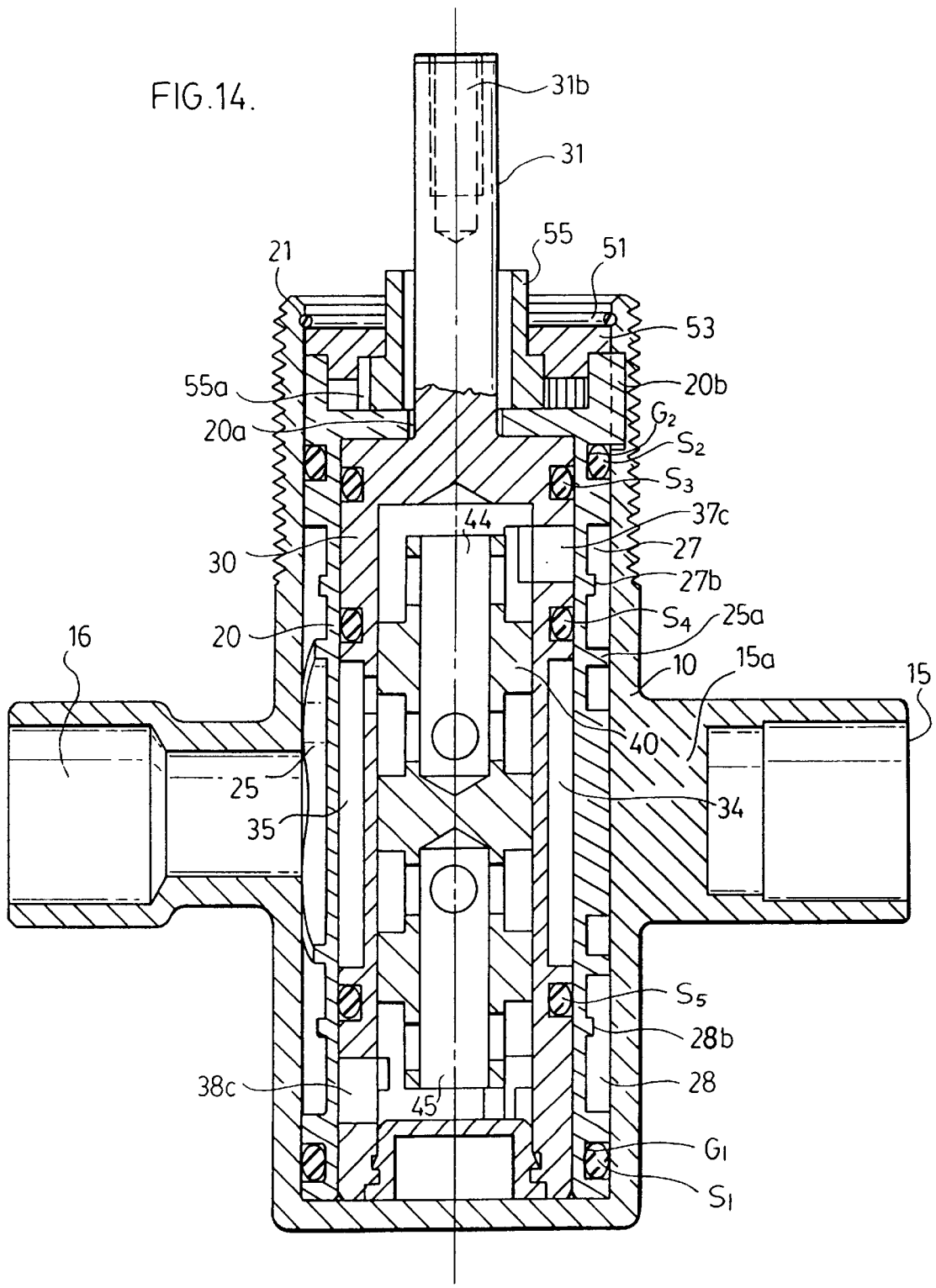
FIGS. 14 and 15 are cross-sectional views through the center line of the valve assembly through the outlets 15 and 16 and through the inlets 13 and 14 respectively, and illustrated in a preferred embodiment of the invention.

Referring now to the moveable stem member 30 as best seen in FIGS. 1, 6 and 7, and alternatively in FIGS. 8 and 9, the stem member therefore has a handle portion 31 to which a handle trim portion may be affixed at 31b which is threaded. The top of the handle portion 31 includes a particular substantially flattened eliptical shape at 36 which will mate with the opening 56 of the safety device 50. In this manner, the tab 55a will move with the stem. The stem handle 31 will, however, pass through the opening 20a and 53b without interfering or binding. The moveable stem therefore may be made from brass in two parts which includes a press-fit outer sleeve portion fixed to the brass inner portion. Together the two portions provide for the moveable stem. Alternatively, the entire unit may be made from one piece as shown in FIGS. 8 and 9 from thermoplastic material and be utilized in combination with the seal of FIG. 9a. There would be essentially no difference in operation, however, with the two embodiments. The advantage, however, of either embodiment must be fit to the particular application. Outlets 37c and 38c are therefore provided as previously described having a generally L-shaped configuration. These outlets are offset a predetermined number of degrees from one another as best seen in FIGS. 6 and 7 to therefore provide the alignment of the openings 37c and 38c respectively with the openings 27c and 28c provided within the stationary sleeve 20. Within FIGS. 6 and 7 in ghostline, the openings 27c and 28c are shown in order to illustrate the overlapping of the two outlets 38c with the outlets 28c. The outlet waterways are therefore defined in sections 37 and 38 disposed between grooves G3 and G4 which are typically sealed as best seen in FIG. 14 via seals S2 and S4. These seal portions therefore retain the integrity of the outlets and the waterways within the assembly. The areas 38 may be separated from the bottom of the valve assembly as seen in FIG. 14 by a seal S5 contained within groove G5, and alternatively in the embodiments of FIGS. 8 and 9 an additional seal S6 contained within groove G6. These portions therefore define the waterway for the outlet of the hot and cold water from the stem to the sleeve.

Referring now to the inlet portions provided with the stem portion 30, there is provided a waterway 34 and 35 which allows for hot and cold water to enter the valve assembly when the seal portion 39a does not abut against the circumference of the inlet 24 of the stationary sleeve 20. At this position, as seen in FIG. 15, neither hot nor cold water will enter the valve. However, when the stem member is rotated to the selected position shown in FIG. 13 by the user, the water will enter the valve into the waterways 34 and 35 respectively for hot and cold water. These waterways will be retained as separate because of the unique seal 39 provided with the stem 30 which includes arm portions 39c which extend down into a slot Rx disposed in rib R2 within the material providing the outer sleeve portion of the stem 30. Another portion Rx is disposed within the rib portion R1 not shown to anchor the arms 39b and 39c within the portions Rx as best seen in FIGS. 1, 6 and 7. This seal therefore includes two portions which extend substantially diagonally at 39b and 39c in opposite directions from the retaining portion Rx for the tabs 39d to therefore anchor the seal 39 in its position as shown in the Figures. Waterways 35 and 34 are therefore provided for cold and hot water respectively and to maintain the integrity of the cold and hot water and to allow the cold and hot water to pass through openings 35a and 34a into the pressure balancing spool 40 and into openings 43 and 44 defined within groove portions therefore. These groove portions are defined between annular portion 40a, 40b and 40c, respectively, with the water exiting from the pressure balancing spool at 45 and 42 for the hot water, and 41 and 44 for the cold water. The water will then pass to the outlets 37c and 38c, respectively which are selectably alignable with the outlets 27c and 28c provided with the stationary sleeve 20. In the alternative embodiments of FIGS. 8 and 9, the identical features are found. The only difference in this structure is that the unique seal 39 is replaced with a seal 3 as best seen in FIG. 9a which is contained within a pre-formed channel 33 defined with an opening 33a and upwardly extending angled grooves 33c for receiving portion 3c of the seal while portions 3a and 3b seat within the substantially circular grooves 33d as best seen in FIG. 9. The seal therefore separates the waterway 35 and 34 much the same as seen in FIGS. 6 and 7. The operation of the moveable stem of FIGS. 8 and 9 will be identical to that of FIGS. 6 and 7 therefore.

Figure 10:
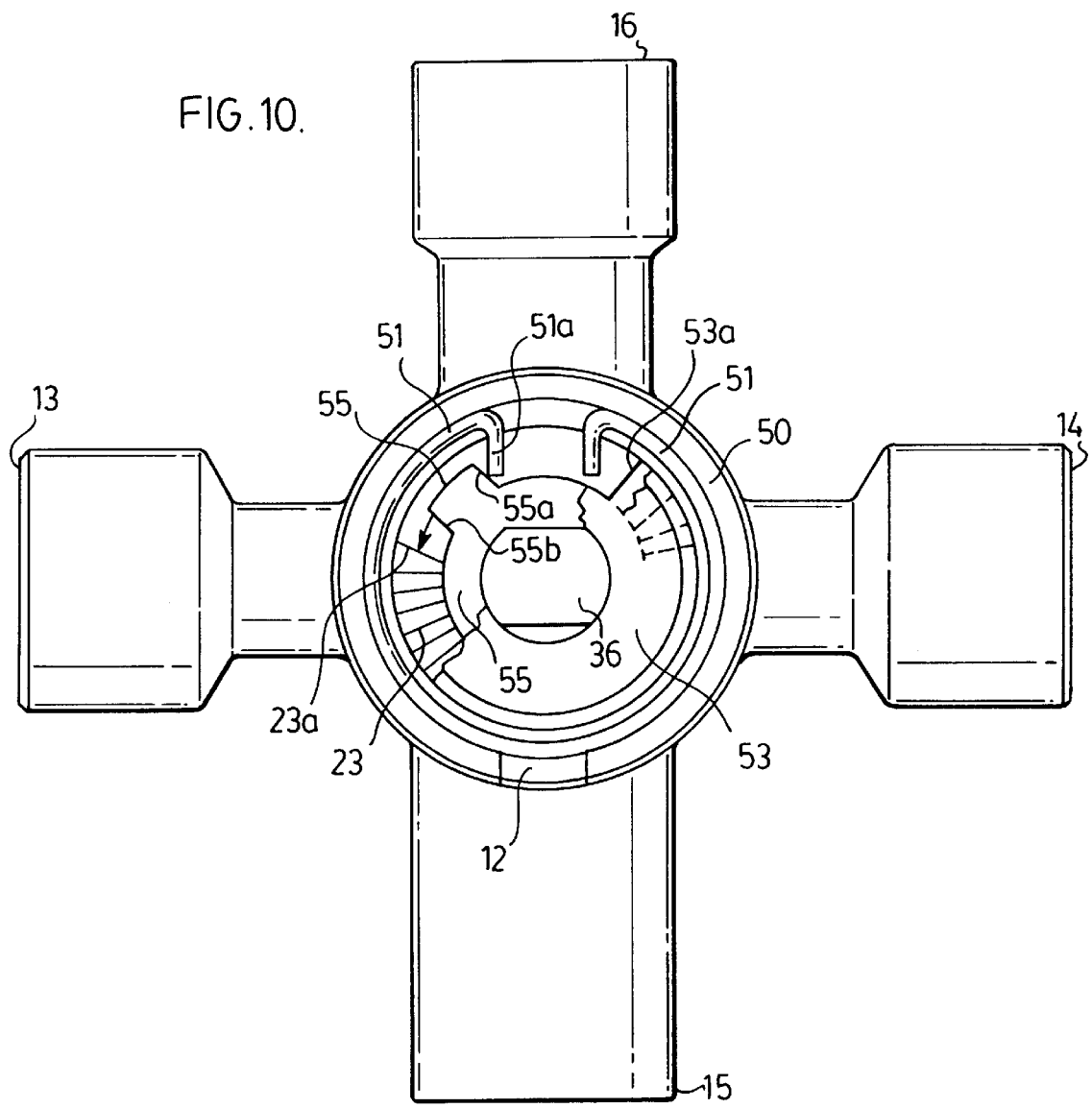
FIGS. 10 and 11 are top schematic views of the safety device incorporated with the valve assembly illustrating the interfitting and interaction of the components thereof and illustrated in a preferred embodiment of the invention.
Figure 11:
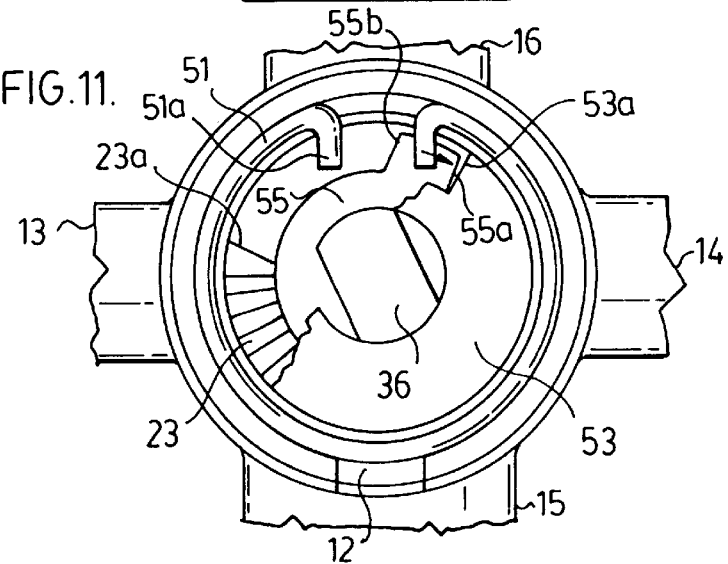

Referring now to FIGS. 1, 10 and 11, there is found a unique safety device 50 which includes a moveable stop portion 55, an adjustable stop portion 53 and a retaining clip 51, all which are retained within the opening defined by the space between the teeth 23 and the shoulder 21 of the stationary sleeve 20 as best seen in FIG. 14. When assembled, the moveable stop 55 is inserted on the stem portion 31 when the opening 56 engages the stem at 36. A tab portion 55 extends to provide the moveable stop having stop surfaces 55a and 55b provided therewith. The adjustable stop 53 includes an opening which extends around the stem 31 in a non-interfering fashion as best seen in FIG. 14. The teeth 53c are adjustably located within teeth 23 provided proximate the top of the stationary sleeve 20 to set the stop surface 53a at the desired location. This stop surface in combination with the stop surface 55a will therefore provide an adjustable stop position to control the temperature of the hot water allowed to exit the valve by limiting the motion of the valve to include some of the positions illustrated in FIG. 13. This will be particularly useful for institutions such as schools and hospitals for safety purposes. When the valve therefore is assembled, the cartridge is inserted within the opening 11 of the housing. The stop portion 55 is then inserted on the end of the stem 31 and the adjustable safety 53 is positioned to the desired location to limit the rotation of the moveable stem member between the stop positions defined at 23a by the fixed stop provided with the set of teeth 23 disposed proximate the top of the stationary sleeve 20. The stop surface 53a may therefore be adjusted in position to the desired location so as to engage the stop 55a and therefore limit the motion of the moveable stem member 30 to between the stop positions when surface 55b engages surface 23a as substantially shown in FIG. 10 to the position as best seen in FIG. 11. The retaining clip 51 therefore is inserted in position under the shoulder 21 to retain all portions as a tight fit. This retaining portion may be removed by utilizing, for example, needle nose pliers to press the ends 51a together, thus reducing the diameter of the clip 51 and allowing easy removal thereof and readjusting of the stop position if necessary. Alternatively, the portions 53 and 55 may be removed entirely to allow for a unique feature of the valve assembly. The entire moveable stem 30 may be rotated 180 degrees while the valve is under pressure to reverse the hot and cold water ports into the valve assembly at 13 and 14 in the housing 10 should an installer incorrectly install the valves so that the typical hot and cold water selection positions illustrated on the handle trim portion will coincide with the operation of the valve. The safety portion will then be reassembled by inserting the member 55, member 53 back on the handle 31, and installing the clip 51 in position. This reversing adjustment or alternatively adjustment of the safety position may be done at any time as desired by the user of the valve.

In operation therefore, assuming the valve is in the closed position as substantially shown in FIG. 15, water will enter the valve through inlets 13 and 14 respectively. As the moveable member 30 is rotated, the seal 39a will move out of line of the waterway to allow water to enter the valve and into the waterways 35 and 34 defined between the inner wall of the stationary sleeve 20 and the perimeter of the moveable stem 30 within areas 35 and 34, respectively. The water will then enter openings 35a and 34a, and 43 and 44 in the pressure balancing spool. Should the cold water volume be reduced as results typically when a toilet is flushed, the pressure balancing spool will compensate for the reduction in pressure on the cold water side at inlet 43 by moving in the direction of the cold water inlet and thereby reduce the inlet via portions 40c and choke off on the inlet to the hot water as is well known. Under normal circumstances, the water will then exit the pressure balancing spool at 41 and 44 for cold water, and 42 and 45 for hot water. The water therefore will exit as best seen in FIG. 14 through the outlets 37c which are selectively engageable with the outlets 27c of the stationary sleeve as shown in FIG. 13 so that the alignment of the two ports 37c and 38c, and 27c and 38c provide for the positions shown in FIG. 13. The water will then pass to the perimeter of the stationary sleeve at groove 27 and 28, ride over the reduced rib cross section at 27b and 28b into the waterway and mixing chamber 26 on the perimeter of the sleeve 20. The water will then exit at outlet 15 separated or bifurcated at 15a into two separate waterways as best seen in relation to FIG. 2. The water will exit at outlet 15b as seen in FIG. 2 to the tub until such time as the shower diverter valve is operated which is typically positioned on the spout of the tub, and it is not illustrated herein. In this condition, the water cannot therefore enter the tub and will revert back into the valve assembly through waterway 15c which behaves as an inlet as seen in FIGS. 2 and 12. The water therefore will be mixed in the mixing chamber 26 defined between the perimeter of the stationary sleeve 20 and the interior of the housing 10, pass through outlet 15b, revert back into outlet 15c to area 25d within the waterway 25 defined on the exterior of the surface of the stationary sleeve by rib 25a separating waterway 25 from waterway 26 and sealing against the edge of portion 15a, allowing the water to pass around the circumference of the sleeve through waterway 25 to area 25c of the stationary sleeve which is in registration with outlet 16 which passes to the shower. In this manner therefore, the sleeve includes all of the waterways necessary to function as a complete valve assembly in cooperation with a diverting valve without the need to provide a venturi in the housing of the valve assembly.

Referring now to FIG. 13, there is illustrated the unique positions which the valve may be adjusted to in relation to cold and hot water exiting the valve. At I, 100% cold and 0% hot is achieved. At II, 100% hot and 100% cold waterflow capability is achieved. At III, 100% hot water capability is achieved, and at IV and VIII, 0% will flow from the valve. At V, 100% hot is achieved. At VI, 100% hot and cold is achieved. At VII, 100% cold is achieved. Heretofore, in operating known cycle valve, at best in order to provide for mixed water, or alternatively hot and cold water in a cycle valve, it is not possible to obtain 100% hot and cold waterflow. With this invention, 100% hot and cold capability is achievable without the need to choke off the water supply or the outlet from the valve as is found in many of the prior art structures which create the unnecessary limitation obviated by the present invention.

Referring to FIG. 2 and FIG. 12, in order for the assembly to function effectively, the rib portion 25a must seal tightly against the wall 15a of the housing. This is possible since the sleeve 20 is stationary, and once set in position will not vary. All seals are made from buna N rubber or the like.

As many changes can be made to the preferred embodiments of invention without departing from the scope of the invention; it is intended that all material contained herein be interpreted as illustrative of the invention and not in a limiting sense.

What is claimed is:

1. A valve assembly comprising a standard housing having an opening for receiving a cartridge, the housing having two inlets and two outlets, the outlet to the tub spout is bifurcated, said housing having a cartridge contained within the housing opening, the cartridge including a stationary body sleeve having a perimeter and disposed within the opening of the housing and having inlet means in alignment with the inlets of said housing for allowing water to enter the valve assembly and for retaining water separating sealing means adjacent thereto, the stationary sleeve having means for obviating the need for a flow restrictor in the valve housing adjacent the outlet leading to shower for the correct operation of the valve, said means for obviating the need for a flow restrictor being a restricted passage provided between the perimeter of the stationary sleeve and the housing, thus providing a waterway and mixing chamber between the perimeter of the sleeve and said housing which biases the valve away from the shower outlet in normal operation until a diverter on the spout outlet is operated the cartridge having a moveable stem member provided therewith and moveable within the housing and within the stationary body sleeve of the cartridge, the movable stem member having water inlet sealing means sealing against an inner wall portion of the stationary body sleeve, the moveable stem member providing in cooperation with the inner wall of the stationary sleeve and the water inlet sealing means a path of waterflow into the stem member and out of the stem member to a mixing chamber formed between the body sleeve and the housing; the valve assembly when assembled including all of the waterways required for the operation of the valve.

2. For use in a valve assembly having a standard housing, a cartridge in use contained within an opening within the housing, the cartridge comprising a stationary sleeve disposed within the housing and having inlet means and means for retaining inlet sealing means adjacent said inlet means, the sleeve having therein disposed a moveable stem member moveable within the stationary sleeve, the moveable stem member includes a stem sleeve which is press fit with a stem body and includes cutouts, grooves, and/or slots wherein the combination of the interior of said stationary sleeve and said cutouts, grooves, and or slots of said stem member defining the path of water flow into the moveable stem member and out of the moveable stem member to a mixing chamber formed between the perimeter of the stationary body sleeve and the housing, said mixing chamber comprising a restricted passage provided between the perimeter of the stationary body sleeve and the housing, the cartridge when assembled with the housing including all of the waterways required for the operation of the valve.

3. A valve cartridge for a valve housing, the housing having an opening therein for receiving the cartridge in use and an inner wall surrounding the opening, the housing having fluid ports defined therewith to provide a fluid path to and from to the cartridge in use; the fluid ports being disposed in the same horizontal plane and being axially aligned;

the valve cartridge comprising a stationary body sleeve for carrying water sealing means, the stationary sleeve having inlets and outlets provided therewith, said water sealing means being disposed adjacent said inlets, the stationary sleeve when assembled with the housing and the cartridge providing automatically and reversibly the waterways of the valve cartridge, said cartridge having disposed therewith means disposed with the sleeve in combination with a bifurcated outlet disposed with the housing to provide in an installation having two selective outlets in combination with the diverter normally provided with a spout for a bath an automatic biasing of the water flow from the valve cartridge to the bifurcated housing outlet without the need for there to be provided a restriction in the housing proximate the outlet leading to the shower.

4. The assembly of claim 1 wherein the stem sleeve of the stem cartridge in use further comprises an at least first inlet, and at least a first outlet, the stem sleeve carrying an inlet sealing portion including a first seal to seal against the inlet of the stationary sleeve, and a second seal to separate and retain the integrity of the separate waterways disposed between the interior of the stationary sleeve and the perimeter of the stem sleeve, said first seal being generally circular in form and being raised laterally toward the stationary sleeve from a seat therefore provided with the stem sleeve and to abut the inner surface of the stationary body sleeve, the sealing portion having a second seal extending laterally and diagonally away from the first seal and from the seat therefore for engaging the inner wall of the stationary body sleeve and thereby separating of the waterways of the cartridge, the sealing portion presenting a sealing surface for selective alignment with an inlet of the cartridge when the stem member is moved between the valve closed and open positions, wherein at the closed position the first seal is positioned proximate the inlet of the stationary sleeve of the cartridge, and the second seal abuts the inner wall of the stationary sleeve proximate the inlet seal of the body sleeve thus respectively preventing fluid from entering the cartridge and preventing fluid from crossing over waterpaths in the cartridge when in the open position, the stem member further being moveable to and from selective valve opened positions whereat the first seal is moved out of alignment with the inlet of the stationary sleeve and the second seal abuts the interior of the stationary sleeve separating the waterways and at these opened positions the outlet of the stein member overlapping all or part of the outlet of the stationary sleeve, the raised portions of the seal portion abutting the inner wall of the stationary body sleeve away from the direct fluid flow path and thus allowing fluid to enter and exit the cartridge and whereat the seal portion has moved partially or totally away from stationary sleeve inlet with the first seal of the seal portion positioned to allow fluid to enter the cartridge.

5. The assembly of claim 3 wherein the stem sleeve of the stem cartridge in use further comprises an at least first inlet, and at least a first outlet, the stem sleeve carrying an inlet sealing portion including a first seal to seal against the inlet of the stationary sleeve, and a second seal to separate and retain the integrity of the separate waterways disposed between the interior of the stationary sleeve and the perimeter of the stem sleeve, said first seal being generally circular in form and being raised laterally toward the stationary sleeve from a seat therefore provided with the stem sleeve and to abut the inner surface of the stationary body sleeve, the sealing portion having a second seal extending laterally and diagonally away from the first seal and from the seat therefore for engaging the inner wall of the stationary body sleeve and thereby separating of the waterways of the cartridge, the sealing portion presenting a sealing surface for selective alignment with an inlet of the cartridge when the stem member is moved between the valve closed and open positions, wherein at the closed position the first seal is positioned proximate the inlet of the stationary sleeve of the cartridge, and the second seal abuts the inner wall of the stationary sleeve proximate the inlet seal of the body sleeve thus respectively preventing fluid from entering the cartridge and preventing fluid from crossing over waterpaths in the cartridge when in the open position, the stem member further being moveable to and from selective valve opened positions whereat the first seal is moved out of alignment with the inlet of the stationary sleeve and the second seal abuts the interior of the stationary sleeve separating the waterways and at these opened positions the outlet of the stem member overlapping all or part of the outlet of the stationary sleeve, the raised portions of the seal portion abutting the inner wall of the stationary body sleeve away from the direct fluid flow path and thus allowing fluid to enter and exit the cartridge and whereat the seal portion has moved partially or totally away from stationary sleeve Inlet with the first seal of the seal portion positioned to allow fluid to enter the cartridge.

6. A stationary body sleeve for use with a housing and a stem cartridge contained with in a valve assembly, said stationary body sleeve comprising a hollow cylinder having an exterior and an interior and having openings for inlets and outlets extending from the exterior to the interior, the hollow cylinder having sealing means retaining portions for retaining sealing means in use to ensure the integrity of separate waterways for a valve assembly incorporating the hollow cylinder, the stationary body sleeve having means disposed with the sleeve to provide in an installation having two selective outlets along with the surfaces of the housing, a reversible automatic preference of the water flow to a predetermined selective outlet, the automatic preference being effected by a continuous rib for responding to a back pressure directing the water flow to the tub spout, raised laterally toward the housing when installed and in combination with the housing surface.

7. The valve assembly of claims 1, 2, 3, 4, or 5 wherein said cartridge of the valve assembly has a retaining shoulder provided therewith, the valve including a removable retainer provided with the valve cartridge for abutting under the retaining shoulder provided with the cartridge and with a stationary sleeve proximate the top thereof to retain the cartridge in use, said retainer also for retaining a supplementary safety and comfort device provided with the valve to limit the cartridge in movement within the housing and to allow for ease of removal of the cartridge and reinstallation of a new cartridge in the same housing, the cartridge including predetermined waterways disposed between said housing and said stationary sleeve and said stationary sleeve and stem member to allow for easy correction of the valve position if the installer makes an error and reverses the water flow as labeled on the handles of the valve, the correction being effected by removing the retainer and if present the supplementary safety device to enable the valve to be reversed without shutting off the water supply, wherein rotation of the stem 180 degrees, when the retainer and if present the safety device are removed, allows for uninhibited movement of the cartridge outside of the limitations of the safety device whereby the waterways may be reversed without the need to shutoff the water or remove the cartridge from the housing whereat thereafter the retainer and the preferred safety device are reinstalled.

8. The valve assembly of claim 7 wherein said safety and comfort device includes a first member for removable fixed installation on the stem spindle of the cartridge, said first member including a tongue extending laterally therefrom, the safety device having a second member for removable non-interfering installation about said stem spindle, said second member having disposed proximate the bottom thereof detonate portions disposed about a predetermined number of degrees providing a first adjustable high limit temperature stop for use in combination with the tongue of the first member to establish preselected comfort zones for the valve, the top of said stationary sleeve having disposed therewith detonate portions for mating with the detonate of said second member and for providing a primary fixed off position stop, wherein the high limit and the primary stop of the second member and the stationary sleeve respectively may be engaged by said tongue of said first member to limit the motion of the valve between the closed and open positions, said stops being adjustable in position by the user defined positions with the engagement of the detonates of the second member with the detonates of the cartridge and the moveable sleeve, wherein when the user wishes to change the stop portions of the valve should the water temperature wish to be controlled and lowered in temperature at the valve outlet, the user will remove the retainer and rotate the second member of the safety device a predetermined number of degrees to alter the position of the high limit stop to adjust and select the desired water temperature, wherein the retainer will be reinstalled and the stem will be further limited in rotation by the engagement of the tongue with the stop.

9. A valve assembly comprising a housing having a top and bottom and having disposed between its top and bottom an opening wherein a cartridge is inserted, said housing having inlets and outlets for hot and cold water, said housing carrying a cartridge in use, said cartridge including portions which are moveable in relation to said housing, said cartridge including a stationary sleeve having a first area and a second area separated by a rib portion raised laterally away from said areas, and inlets and outlets, and an interior smooth surface, said cartridge having disposed within said stationary sleeve a moveable stem member which is rotatable, said moveable stem member having a perimeter, and having disposed about its perimeter a first and second area separated by a compound sealing means, said sealing means including a first primary sealing portion for sealing the inlet of the stationary sleeve and a secondary sealing means for creating a first cold and a second hot chamber area of the moveable stem member, said moveable stem member having disposed therewith inlets for allowing water to pass into the center thereof, said outlets of said moveable stem and said cartridge being selectively alignable to provide for selecting temperature and a controlled volume of water through the valve assembly, said housing including in the outlet to the bathtub a dividing dam bifurcating the cross section of the outlet into a tub and shower area sealed and separated by said rib portion butting against an edge of said dam, wherein when water enters the valve assembly the first and second chamber area of the moveable stem member will maintain separation of the waterways for hot and cold water, and wherein the first and second mixing chamber areas of the stationary sleeve will provide the necessary waterways for water exiting the valve, said first mixing chamber area of said stationary sleeve being in alignment with the outlet from said stationary sleeve to provide in combination with the interior of said housing opening a waterway and mixing chamber to provide a path for mixed water to exit through the tub spout through one half of the bifurcated cross section of the tub outlet, and wherein when a diverting mechanism is operated typically found on the spout of a tub, the water directed to the spout will be diverted back over the dividing dam into the shower area of the bifurcated outlet back into the second shower chamber area of the stationary sleeve and the waterway provided thereby between the sleeve and the housing, and through to the outlet to the shower which is in communication with the second area.

10. The valve assembly of claim 9 wherein the first area is generally in communication with the tub outlet of the valve, and the second area is generally in communication with the shower outlet of the valve only when the diverting mechanism is operated, otherwise, the second area is short circuited from the operation of the valve assembly wherein the need for a venturi in the housing is therefore obviated in that the water cannot reach the shower outlet until such time as the diverter is operated.

11. The valve assembly of claims 1, 2, 3, 4, 5, 9 or 10 wherein the outlets of said moveable stem and said stationary sleeve are substantially L-shaped, and inverted L-shaped which are selectively alignable to provide for selecting temperature and a controlled volume of water through the valve assembly and thereby increasing flow capability above known devices.